Oct. 24, 1967  J. P. FRANCIS  3,348,875
AUTOMOBILE WINDSHIELD WEATHER VISOR
Filed Aug. 11, 1966
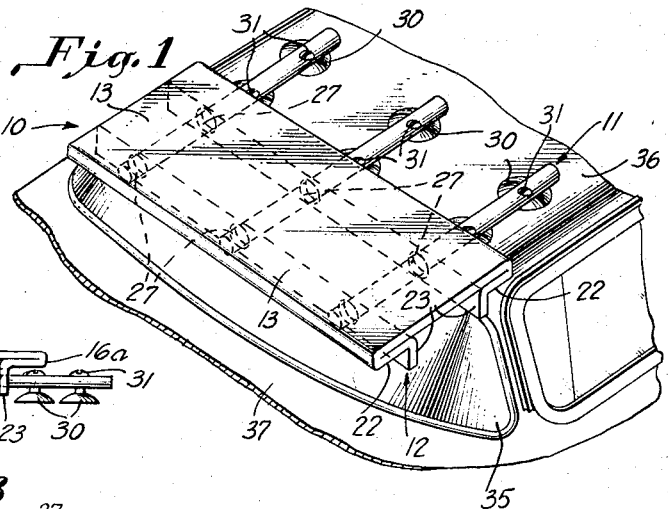
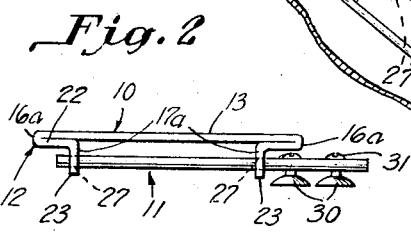
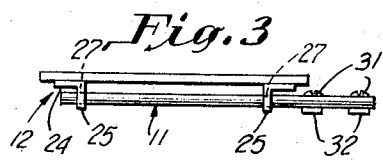
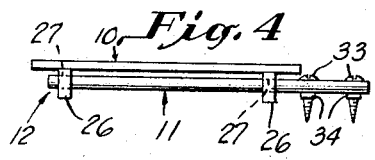
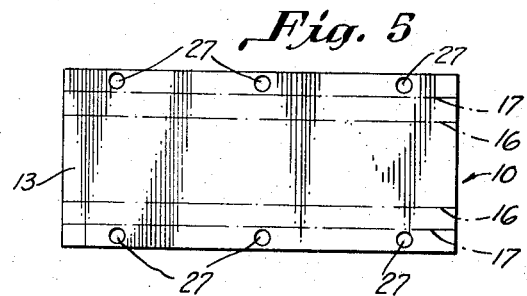
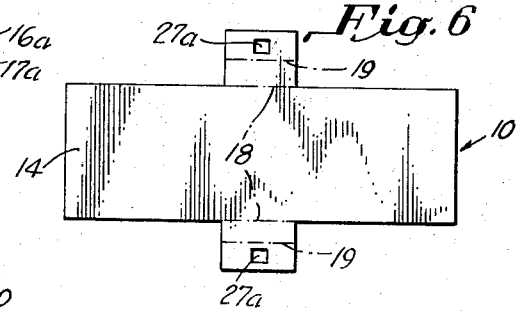
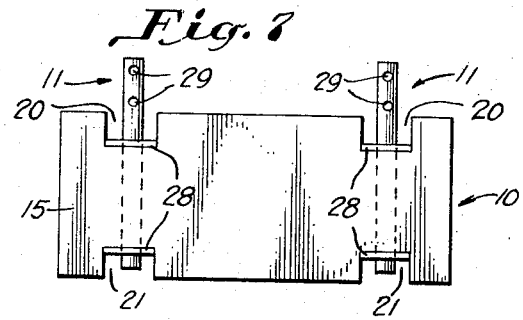
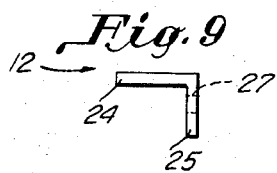
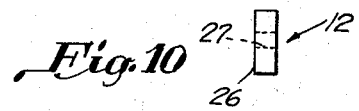
INVENTOR
John P. Francis

United States Patent Office 3,348,875
Patented Oct. 24, 1967

3,348,875
AUTOMOBILE WINDSHIELD WEATHER VISOR
John P. Francis, 20 Boston St.,
Haverhill, Mass. 01830
Filed Aug. 11, 1966, Ser. No. 571,816
9 Claims. (Cl. 296—95)

ABSTRACT OF THE DISCLOSURE

This invention provides weather protection to the windshield area of an automobile when the vehicle is in a parked position, such as in a drive-in theatre. The removably attached rain visor panel, and the removably attached longitudinally disposed visor supports, with or without the attached roof engaging means, may be removably attached as a complete unit, or in part, to or from the roof top of the automobile. Rain sealing engagement between the retractable rain visor panel and the roof top of the automobile is also provided.

---

This is a continuation-in-part of application Ser. No. 471,764 filed July 13, 1965, now Patent No. 3,281,182. Weather visor supports and weather visor panel structures are shown and described in my copending application. My invention therefore, is concerned primarily with improved and modified embodiments of a windshield weather visor structure and the support thereof.

This invention relates to automobile windshield weather visors, and more particularly to a removably attached weather protector adapted for use in the protection of the windshield area, or other glass or transparent areas of the vehicle from rain, sleet, snow or ice when the vehicle is parked in a drive-in theatre, or parked in any other form of an outdoor vehicle parking area.

A main object of the invention is to provide a novel, exceedingly simple, and improved weather protector which may be made of expendable and inexpensive material so that it may be discarded after one or more uses. This inexpensive form of a weather visor structure may be constructed of material such as waterproof cardboard, or any other paperboard or similar inexpensive sheet material. The material may be treated with a water-repellant substance commonly employed so that the visor panel is somewhat impervious to water or moisture.

A further object of the invention is to provide a weather visor panel structure having one or more laterally disposed vertical supporting members, the vertical supporting members being adapted to freely engage one or more visor supports for longitudinally slidable attachment and adjustment, and for the simplified removal of the visor panel structure in a like manner.

A still further object of the invention is to provide a visor panel which may be pre-shaped in structure in the use of rigid materials such as plastic, metal or other materials too difficult to bend for instant application, and also when used by the weaker sex.

With these objects and still others in view, as will hereinafter more fully appear, the invention comprises certain novel constructions, combination and arrangement of parts, hereinafter described and claimed and illustrated in the accompanying drawings, in which:

FIGURE 1 is a fragmentary view of an automobile showing the weather visor panel structure and the supporting means for supporting the visor structure over the roof top and the windshield area.

FIGURE 2 is a side elevation view, as in FIGURE 1, showing the weather visor panel structure with the vertical supporting members thereof engaged to the longitudinally disposed visor support.

FIGURE 3 is a side elevation view of a modified form of a visor panel structure provided with vertical supporting members positioned inwardly of the forward and rear lateral edges of the visor panel.

FIGURE 4 is also a side elevation view of another modified form of a visor panel structure, the vertical supporting members are as shown in FIGURE 10.

FIGURE 5 is a top plan view of a flat visor panel structure provided with a series of laterally disposed scored lines to form the shaped structure of FIGURES 1 and 2.

FIGURES 6 is a top plan view of a modified form of a bendable flat visor panel structure provided with a series of laterally scored or crease lines.

FIGURE 7 is also a top plan view of another modified form of a bendable flat visor panel structure.

FIGURE 8 is an end elevation view of the lateral portion of the visor panel structure of FIGURES 1, 2 and 3.

FIGURE 9 is a side elevation view of a vertical supporting member of FIGURE 3; and FIGURE 10 is a side elevation view of a vertical supporting member of FIGURE 4.

Referring now more particularly to the drawings, attention is directed primarily to FIGURES 1, 2, 5, 6 and 7, wherein numeral 10 generally indicates the visor panel structure, also shown specifically as visor panel structure 13, 14 and 15. Numeral 11 generally indicates the longitudinally disposed visor supports. Numeral 12 generally indicates the visor panel vertical supporting members, also shown specifically as vertical supporting members 23, 25, 26 and 28.

In FIGURE 1, a portion of an automobile 37 is shown, with the visor panel 13 made of flexible or semi-rigid waterproof material, the visor panel 13 being movably supported by the vertical supporting members 23 engaging the longitudinally disposed visor panel support 11.

The longitudinally disposed visor supports 11, made of metal, plastic or waterproof cardboard material and preferably of tubular construction, are supported by the roof engaging means. The roof engaging means comprises the vacuum cups 30 of FIGURES 1 and 2, or the magnetized roof engaging members 32 of FIGURE 3, and secured in position by the threaded bolt members 31 engaging the apertures 29 of the visor supports 11 shown in FIGURE 7.

In the side elevation view of FIGURE 4, there is shown modified roof engaging means in the form of longitudinally spaced apart spacer members 34. The spacer members 34 are adapted to provide the selected vertical spacing of the visor panel 10 relative to the roof top 36, depending upon the thickness thereof. Sheet metal screws 33 are employed to secure the visor supports 11 at the selected location on the roof top.

In FIGURE 5, which is a top plan view, there is shown a substantially rectangular shaped flat visor panel structure 13 constructed of flexible cardboard or similar inexpensive sheet material, and which may be treated with a water-repellant substance commonly applied so that the material is somewhat impervious to moisture or water. The flat sheet 13 is provided with two forward laterally disposed score or crease lines 16 and 17, and also two rear laterally disposed score or crease lines 16 and 17. Laterally spaced apart apertures 27, adapted to slidably engage the visor supports 11 therethrough, are located between the score lines 17 and the lateral edges of the flat sheet 13.

In FIGURES 1 and 2, there is shown the completed visor panel structure 13 which is formed by the bending of the flat sheet 13 of FIGURE 5, referred to above. The bent portions at 16a and 17a form the vertical supporting members 12, each having a horizontal portion 22 and a vertical portion 23 as shown.

In FIGURE 6, which is a top plan view, a modified flat visor panel structure 14 is shown provided with a forward and a rearward extension of the flat sheet 14 having two forward laterally disposed score or crease lines 18 and 19, and also two rear laterally disposed score or crease lines 18 and 19. A centrally disposed generally rectangular-shaped aperture 27a is provided so as to engage a single centrally positioned rectangular-shaped visor support 11. The flat sheet 14, when bent or shaped along the score lines 18 and 19, forms a visor panel structure 10 somewhat as shown in FIGURES 1 and 2.

Another modified visor panel structure 15 is shown in FIGURE 7 whereby the vertical supporting extensions 28 are formed by the cut portions at 20 and 21, and bent downwardly therefrom. The visor panel structure 15 is provided with the laterally spaced apart and longitudinally disposed visor supports 11 engaged to the said vertical supporting extensions 28. The apertures 29 of visor supports 11 engages the roof engaging means 30 and 31 of FIGURES 1 and 2, or means 31 and 32 of FIGURE 3, or means 33 and 34 of FIGURE 4.

Modified vertical supporting members 12, shown specifically as horizontal portions 24 and vertical portions 25 and provided with an aperture 27, are shown in FIGURES 3 and 9. The separable vertical supporting members 12 are preattached by adhesives or other suitable means to the under surface of the visor panel structure 10, and positioned inwardly of the forward and the rear lateral edges of the visor panel 10. The vertical supporting members 12 may also be manufactured as a part of the visor panel structure 10, as a one piece unit, of plastic, sheet metal or paperboard-like material.

In FIGURE 4 the visor panel structure 10 is shown provided with a modified form of vertical supporting members 12 having only a vertical portion 26 provided with an aperture 27, shown in FIGURE 10 also. The vertical supporting members 12 may also be pre-attached by adhesives or other well known means to the under surface of tthe visor panel structure 10. The entire visor panel structure 10 with vertical supporting members 12, as cited in the FIGURE 3 modification, may also be made as an integral unit.

An end elevational view of the lateral portion of the visor panel structure 13 of FIGURES 1, 2 and 5, is shown in FIGURE 8. The visor panel 13 is shown bent to shape at 16a to form the horizontal portion 22, and bent to shape at 17a to form the vertical portion 23 of the vertical supporting member 12. The laterally spaced apart apertures 27 of vertical portion 23 are engaged by one or more visor supports 11, depending upon the lateral width of the motor vehicle and the size of the visor panel structure 10 to be supported. The rear laterally disposed vertical portion, such as 23 of vertical supporting member 12, is also adapted to provide rain sealing engagement with the lateral portion of the roof top 36 upon frictional engagement with the roof top 36.

Referring back to FIGURE 1, the visor panel structure 10 is shown supported over the roof top 36 and the windshield area 35 of an automobile 37. The apertures 27 of the visor panel vertical supporting members 12 are adapted to freely and slidably engage the longitudinally disposed visor supports 11. The rear laterally disposed vertical supporting member 12 may therefore engage or disengage the lateral portion of the roof top 36 depending upon the longitudinal movement of the visor panel structure 10.

It is to be noted that either lateral end, forward or rear, of the visor panel structure 10, may be removably attached to the longitudinally disposed visor support or supports 11.

My invention includes a pre-formed visor panel structure manufactured as a unit, and a bendable flat sheet provided with bendable areas having score or crease lines to provide a readily bendable visor panel structure for instant application during inclement weather. The device is also employed to protect any glass or transparent area from the heat of the sun, and also to protect any area or areas, depending upon the number of devices employed, against sleet, ice or snow while the vehicle is parked.

An important feature of the novel invention is that any size visor panel may be employed, more particularly in reference to the longitudinal length thereof, to provide increased weather protection without increasing the length or relocating the visor supports therefor. This is accomplished and increased, as may be readily seen, by the location of the laterally disposed vertical supporting member in relation to the rear lateral edge of the visor panel.

While certain embodiments of my invention have been disclosed in the foregoing description, it will be understood that various modifications may occur to those skilled in the art. Changes, therefore, in the construction and arrangement, may be made without departing from the spirit and scope of the invention as disclosed in the appended claims.

I claim:

1. A weather visor structure for the windshield of a motor vehicle secured to the roof top thereof comprising a removably attached rain visor panel, a longitudinally disposed visor support, said removably attached rain visor panel being attachable and longitudinally adjustable upon the sliding engagement of said rain visor panel on said visor support, said rain visor panel providing increased weather protection to the roof top rearwardly of the extreme end of the said visor support upon the extended rearward movement of said rain visor panel on said visor support in extending rearwardly thereof, said rain visor panel having at least one vertically elongated laterally disposed vertical supporting member in the form of a panel and extending downwardly from the underside of said rain visor panel with the bottom portion of the said vertical member adapted to frictionally engage a laterally extending portion of the roof top in rain sealing engagement, said vertical supporting member extending laterally and in a longitudinally spaced apart position between the forward and the rear lateral edges of said rain visor panel, said vertical supporting member being provided with an aperture therethrough, roof engaging means mounted on the roof top and engaging the rear portion of said visor support in supporting said support therefrom and over the roof top and the windshield area, said visor support freely engaging the said aperture of said vertical supporting member of said rain visor panel in adjustably supporting said rain visor panel for removable attachment thereto and for the said frictionally engaged rain sealing engagement of the said bottom portion of the said vertical supporting member of said rain visor panel with the roof top upon the said extended rearward movement of said rain visor panel.

2. A weather visor structure for the windshield of a motor vehicle secured to the roof top thereof comprising a removably attached rain visor panel, longitudinally disposed laterally spaced apart visor supports, said removably attached rain visor panel being attachable and longitudinally adjustable upon the sliding engagement of said rain visor panel on said visor supports, said rain visor panel providing increased weather protection to the roof top rearwardly of the extreme end of the said visor supports upon the extended rearward movement of said rain visor panel on said visor supports in extending rearwardly thereof, said rain visor panel having at least one vertically elongated laterally disposed vertical supporting member in the form of a panel and extending downwardly from the underside of said rain visor panel with the bottom portion of the said vertical member adapted to frictionally engage a laterally extending portion of the roof top in rain sealing engagement, said vertical supporting member extending laterally and in a longitudinally spaced apart position between the forward and the rear lateral edges of said rain visor panel, said vertical supporting member being provided with laterally spaced apart apertures, roof engaging means mounted on the roof top and engaging the rear portions of said visor supports in supporting said supports therefrom and over the roof top and the windshield area, said visor supports freely engaging the said apertures of said vertical supporting member of said rain visor panel in adjustably supporting said rain visor panel for removable attachment thereto and for the said frictionally engaged rain sealing engagement of the said bottom portion of the said vertical supporting member of said rain visor panel with the roof top upon the said extended rearward movement of said rain visor panel.

3. A weather visor structure for the windshield of a motor vehicle secured to the roof top thereof comprising a removably attached rain visor panel, longitudinally disposed laterally spaced apart visor supports, said removably attached rain visor panel being attachable and longitudinally adjustable upon the sliding engagement of said rain visor panel on said visor supports, said rain visor panel providing increased weather protection to the roof top rearwardly of the extreme end of the said visor supports upon the extended rearward movement of said rain visor panel on said visor supports in extending rearwardly thereof, said rain visor panel having a forward laterally disposed vertical supporting member and a rear laterally disposed vertical supporting member, each of said vertical supporting members being vertically elongated and in the form of a panel and extending downwardly from the underside of said rain visor panel with the bottom portion of the said vertical member adapted to frictionally engage a laterally extending portion of the roof top in rain sealing engagement, each of said vertical supporting members extending laterally and in a longitudinally spaced apart position between the forward and the rear lateral edges of said rain visor panel, said vertical supporting members being provided with laterally spaced apart apertures, roof engaging means mounted on the roof top and engaging the rear portions of said visor supports in supporting said supports therefrom and over the roof top and the windshield area, said visor supports freely engaging the said apertures of said vertical supporting members of said rain visor panel in adjustably supporting said rain visor panel for removable attachment thereto and for the said frictionally engaged rain sealing engagement of the said bottom portion of the said rear vertical supporting member of said rain visor panel with the roof top upon the said extended rearward movement of said rain visor panel.

4. A weather visor structure for the windshield of a motor vehicle secured to the roof top thereof comprising a removably attached rain visor panel provided with an angular shaped vertical supporting member, a longitudinally disposed visor support, said removably attached rain visor panel being attachable and longitudinally adjustable upon the sliding engagement of said rain visor panel on said visor support, said rain visor panel providing increased weather protection to the roof top rearwardly of the extreme end of the said visor support upon the extended rearward movement of said rain visor panel on said visor support in extending rearwardly thereof, said angular shaped vertical supporting member having a flat horizontal upper portion engaged to the underside of the rain visor panel and an elongated vertical portion extending downwardly therefrom and provided with an aperture therethrough, the bottom portion of the said vertical member adapted to frictionally engage a laterally extending portion of the roof top in rain sealing engagement, said angular shaped vertical supporting member extending laterally and in a longitudinally spaced apart position between the forward and the rear lateral edges of said rain visor panel, roof engaging means mounted on the roof top and engaging the rear portion of said visor support in supporting said support therefrom and over the roof top and the windshield area, said visor support freely engaging the said aperture of said elongated vertical portion of said angular shaped vertical supporting member of said rain visor panel in adjustably supporting said rain visor panel for removable attachment thereto and for the said frictionally engaged rain sealing engagement of the said bottom portion of the said elongated vertical portion of said angular shaped supporting member of said rain visor panel with the roof top upon the said extended rearward movement of said rain visor panel.

5. A weather visor structure for the windshield of a motor vehicle secured to the roof top thereof comprising a removably attached rain visor panel provided with a vertical supporting member, a longitudinally disposed visor support, said removably attached rain visor panel being attachable and longitudinally adjustable upon the sliding engagement of said rain visor panel on said visor support, said rain visor panel providing increased weather protection to the roof top rearwardly of the extreme end of the said visor support upon the extended movement of said rain visor panel on said visor support in extending rearwardly thereof, said rain visor panel comprising a flat sheet of bendable material provided with a first and a second laterally disposed bendable portion at the lateral edge portion of said sheet and having an aperture between the said second laterally disposed bendable portion and the lateral edge of said sheet, said first laterally disposed bendable portion bent downwardly and upwardly to engage the underside of the said sheet to form the horizontal portion of the said vertical supporting member, said second laterally disposed bendable portion bent downwardly from the said horizontal position of said first laterally disposed bendable portion to form the vertical portion of the said vertical supporting member, said vertical supporting member extending laterally and in a longitudinally spaced apart position between the forward and the rear lateral edges of said rain visor panel, roof engaging means mounted on the roof top and engaging the rear portion of said visor support in supporting said support therefrom and over the roof top and the windshield area, said visor support freely engaging the said aperture of said vertical supporting member of said rain visor panel in adjustably supporting said rain visor panel for removable attachment thereto.

6. A weather visor structure for the windshield of a motor vehicle secured to the roof top thereof comprising a removably attached rain visor panel provided with a vertical supporting member, longitudinally disposed laterally spaced apart visor supports, said removably attached rain visor panel being attachable and longitudinally adjustable upon the sliding engagement of said rain visor panel on said visor supports, said rain visor panel providing increased weather protection to the roof top rearwardly of the extreme end of the said visor supports upon the extended rearward movement of said rain visor panel on said visor supports in extending rearwardly thereof, said rain visor panel comprising a flat sheet of bendable material provided with a first and a second laterally disposed bendable portion at the lateral edge portion of said sheet and having laterally spaced apart apertures beween the said second laterally disposed bendable portion and the lateral edge of said sheet, said first laterally disposed bendable portion bent downwardly and upwardly to engage the underside of the said sheet to form the horizontal portion of the said vertical supporting member, said second laterally disposed bendable portion bent downwardly from the said horizontal position of the said first laterally disposed bendable portion to form the vertical portion of the said vertical supporting member extending laterally and in a longitudinally spaced apart position between the forward and the rear lateral edges of said rain visor panel, roof engaging means mounted on the roof top and engaging the rear portions of said visor supports in supporting said supports therefrom and over the roof top and the windshield area, said visor supports freely engaging the said apertures of said vertical supporting member of said rain visor panel in adjustably supporting said rain visor panel for removable attachment thereto.

7. A weather visor structure for the windshield of a motor vehicle secured to the roof top thereof comprising a removably attached rain visor panel provided with opposing forward and rear laterally disposed vertical supporting members, longitudinally disposed laterally spaced apart visor supports, said removably attached rain visor panel being attachable and longitudinally adjustable upon the sliding engagement of said rain visor panel on said visor supports, said rain visor panel providing increased weather protection to the roof top rearwardly of the extreme end of the said visor supports upon the extended rearward movement of said rain visor panel on said visor supports in extending rearwardly thereof, said rain visor panel comprising a flat sheet of bendable material provided with a first and a second laterally disposed bendable portion at each lateral edge portion of said sheet and having laterally spaced apart apertures between the said second laterally disposed bendable portions and the lateral edges of said sheet, said first laterally disposed bendable portions bent downwardly and upwardly to engage the underside of the said sheet to form the horizontal portions of the said vertical supporting members, said second laterally disposed bendable portions bent downwardly from the said horizontal position of the said first laterally disposed bendable portions to form the vertical portions of the said vertical supporting members, said vertical supporting members extending laterally and in a longitudinally spaced apart position between the forward and the rear lateral edges of said rain visor panel, roof engaging means mounted on the roof top and engaging the rear portions of said visor supports in supporting said supports therefrom and over the roof top and the windshield area, said visor supports freely engaging the said apertures of said vertical supporting member of said rain visor panel in adjustably supporting said rain visor panel for removable attachment thereto, the extreme lower portion of said laterally disposed vertical supporting member freely engaging the lateral portion of the roof top in rain sealing engagement therewith upon the rearward movement of said rain visor panel.

8. A weather visor structure for the windshield of a motor vehicle secured to the roof top thereof comprising a removably attached rain visor panel provided with opposing forward and rear laterally disposed vertical supporting members, a longitudinally disposed visor support, said removably attached rain visor panel being attachable and longitudinally adjustable upon the sliding engagement of said rain visor panel on said visor support, said rain visor panel providing increased weather protection to the roof top rearwardly of the extreme end of the said visor support upon the extended movement of said rain visor panel on said visor support in extending rearwardly thereof, said laterally disposed vertical supporting members extending parallel with and in spaced apart relationship relative to the lateral edges of said rain visor panel, each of said vertical supporting members being vertically elongated and in the form of a panel and provided with at least one aperture therethrough, the bottom portion of the said vertical member adapted to frictionally engage a laterally extending portion of the roof top in rain sealing engagement, roof engaging means mounted on the roof top and engaging the rear portion of said visor support in supporting said support therefrom and over the roof top and the windshield area, said visor support freely engaging the said apertures of said vertical supporting members of said rain visor panel in adjustably supporting said rain visor panel for removable attachment thereto and for the said frictionally engaged rain sealing engagement of the said bottom portion of the said rear vertical supporting member of said rain visor panel with the roof top upon the said extended rearward movement of said rain visor panel.

9. A windshield rain visor panel comprising, a generally rectangular flat sheet of relatively stiff cardboard or other bendable material which can be folded and pre-shaped into a rain visor for the windshield of a motor vehicle, said flat sheet having a set of laterally disposed first and second crease lines longitudinally spaced apart from the forward lateral edge of said flat sheet, at least one aperture formed between the said first crease line and the said forward lateral edge of said flat sheet, an additional set of laterally disposed first and second crease lines longitudinally spaced apart from the rear lateral edge of said flat sheet, at least one aperture formed between the said first crease line and the said rear lateral edge of said flat sheet, the bendable portions at both of the said second laterally disposed crease lines bendable downwardly and thence upwardly to freely engage the under horizontal flat surface of said flat sheet, and the remaining bendable portions at both of the said first laterally disposed crease lines bendable downwardly from the said freely engaged horizontally flat bent position to form the said pre-shaped visor, said pre-shaped rain visor adapted to be slidably engaged and movably supported onto a longitudinally disposed visor support upon engaging the said longitudinally spaced apart apertures formed on the said windshield rain visor.

References Cited
UNITED STATES PATENTS 3,174,536  3/1965  Francis _____ 296—95
3,219,385  11/1965  Francis _____ 296—95

BENJAMIN HERSH, *Primary Examiner.*

J. A. PEKAR, *Assistant Examiner.*